Feb. 21, 1950 — F. L. ALBEN — 2,498,230
LOCOMOTIVE AXLE QUILL DRIVE
Filed Oct. 29, 1945 — 2 Sheets-Sheet 1

WITNESSES:
INVENTOR
Frank L. Alben.
ATTORNEY

Patented Feb. 21, 1950

2,498,230

UNITED STATES PATENT OFFICE 2,498,230

LOCOMOTIVE AXLE QUILL DRIVE

Frank L. Alben, Pittsburgh, Pa., assignor to Westinghouse Electric Corporation, East Pittsburgh, Pa., a corporation of Pennsylvania Application October 29, 1945, Serial No. 625,431

5 Claims. (Cl. 105—131)

1

My invention relates, generally, to locomotive drives, and, more particularly, to double-end quill drives of the flexible type.

In my copending application, Serial No. 584,327, filed March 23, 1945, now Patent No. 2,412,327, there is described and claimed a double-end roller bearing flexible quill drive suitable for utilization in an electric locomotive. An object of the present invention is to simplify and improve the structure disclosed in my aforesaid application.

Another object of my invention is to provide a roller bearing quill drive in which access may be readily gained to the roller bearings for inspection.

A further object of my invention is to enclose the roller bearings for the quill in removable bearing cartridges.

Other objects of my invention will be explained fully hereinafter or will be apparent to those skilled in the art.

In accordance with one embodiment of my invention, the quill for a double-end quill drive comprises two overlapping sections which are pressed together. Roller bearings for the quill are enclosed in cartridges which may be moved axially to permit inspection of the bearings. Lateral thrust of the drive is taken by a split collar of a wedge shape clamped around the quill.

Figure 1:
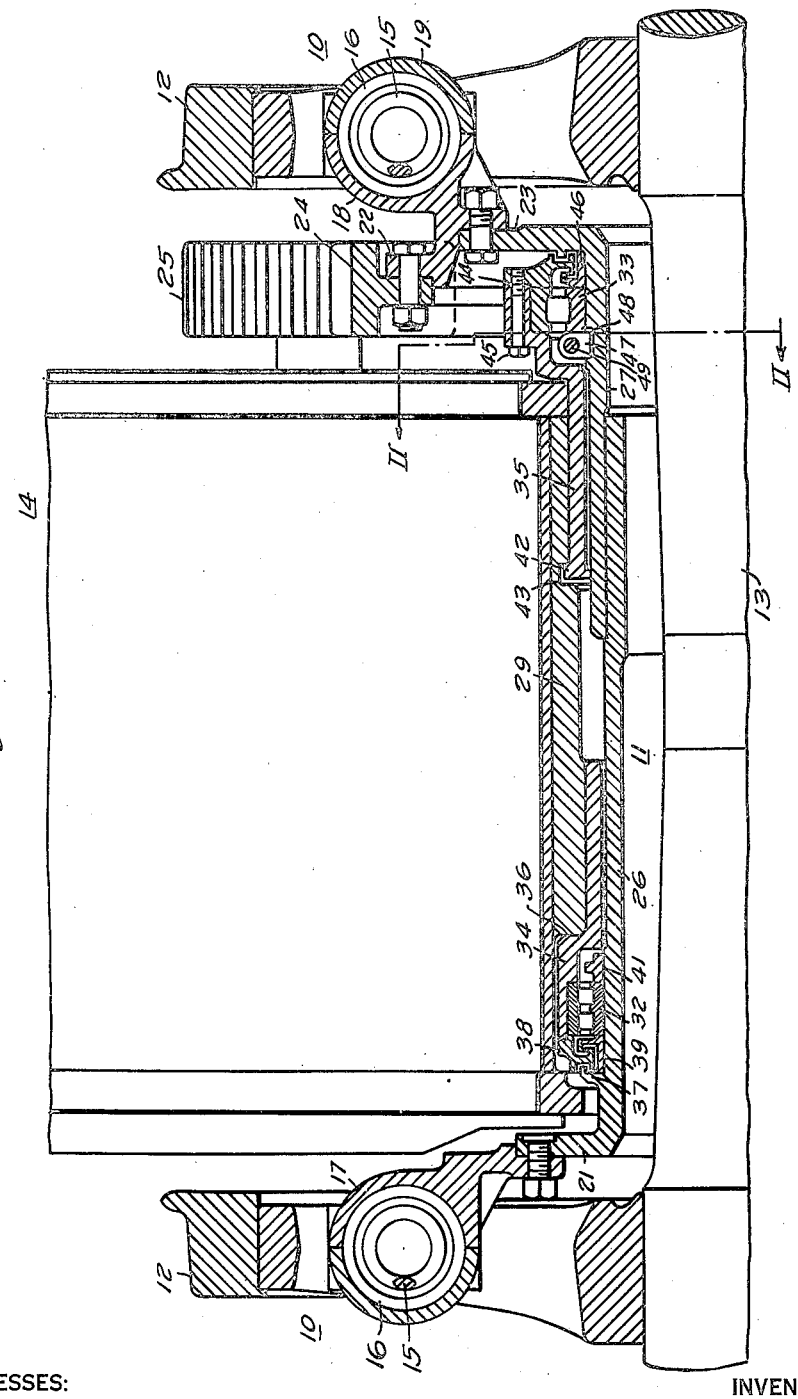
Figure 2:
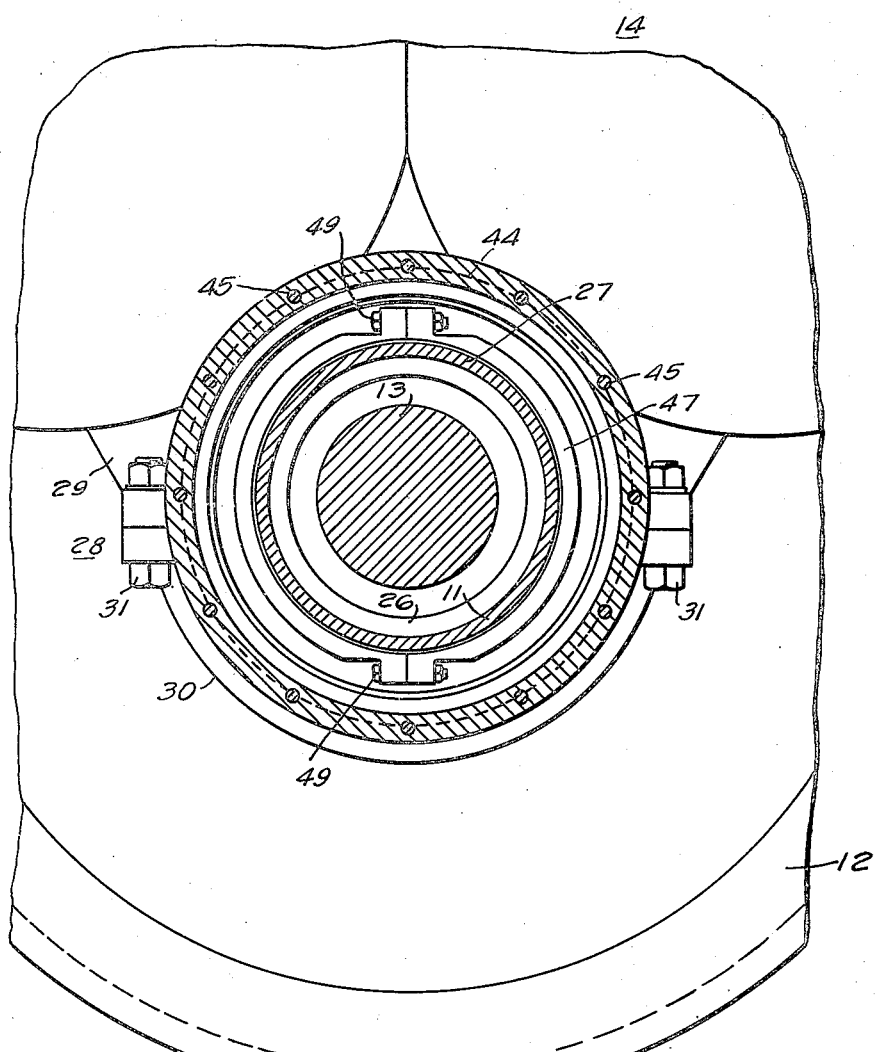

For a fuller understanding of the nature and objects of my invention, reference may be had to the following detailed description, taken in conjunction with the accompanying drawings, in which:

Figure 1 is a view, partially in elevation and partially in section, of a drive embodying my invention, and Fig. 2 is a view, partially in elevation and partially in section, the section being taken along the line II—II of Fig. 1.

Referring to the drawings, and particularly to Figure 1, the drive shown therein comprises a plurality of flexible cup units 10 which are disposed at each end of a rotatable quill 11 to engage the spokes of driving wheels 12, which are secured to an axle 13 disposed inside of the quill 11. The torque for driving the wheels 12 is transmitted from a motor 14, which may be of the twin type as shown in Fig. 2, through the flexible cup units 10. The cup units comprise resilient members 15 which may be either steel springs, as shown, or may be composed of rubber. The resilient members 15 are disposed inside of cups 16 which are retained in spider arms 17 and 18 by removable caps 19.

As shown, the spider arms 17 at one end of the quill may be bolted to a flange 21 on that end of the quill. The spider arms 18 at the other end of the quill are formed integrally with a gear center 22, and are bolted to a flange 23

2 on that end of the quill. A gear rim 24 may be bolted to the gear center 22 and is driven by a pinion 25 secured to the armature shaft of the motor 14. In the event that a twin motor is utilized, each armature shaft is provided with a pinion which engages the gear rim 24.

The quill 11 comprises two cylindrical sections 26 and 27. As shown, the section 27 overlaps the section 26 a predetermined distance and may be pressed on to the one end of the section 26. In this manner, there is only one press fit joint in the entire quill and spider arm and gear center structure. Since the section 27 may overlap the section 26 a relatively long distance, a secure fit is obtained.

As shown most clearly in Fig. 2, the quill 11 is disposed in a divided housing 28 having an upper portion 29 secured to the frame of the motor 14 and a lower portion 30 removably attached to the upper portion 29 by bolts 31. As shown in Fig. 1, a roller bearing 32 is provided for one end of the quill 11 and another roller bearing 33 is provided for the other end of the quill. The bearing 32 is disposed in a cartridge 34 which is mounted in the housing 28. The bearing 33 is disposed in a cartridge 35 also mounted in the housing 28.

The cartridge 34 has a shoulder 36 which engages the housing 28 to prevent inward movement of the cartridge when the two portions of the housing 28 are assembled together. Outward movement of the bearing 32 and the cartridge 34 is prevented by a grooved flange 37 on the quill 11 and retaining rings 38 and 39. A spacing ring 41 is disposed between the inner end of the bearing 32 and the cartridge 34.

The cartridge 35 is retained in position by a flange 42 disposed in a groove 43 in the housing 28. The bearing 33 is retained in the cartridge by a bearing cap 44, attached to the cartridge by bolts 45, and a retaining ring 46.

The lateral thrust of the drive is taken by a split collar 47 which is disposed in a groove 48 in the section 27 of the quill 11. As shown, the collar 47 may be of a wedge shape and is so disposed in the groove 48 that the bearing 33 is firmly held in position when the two halves of the collar 47 are drawn together by means of bolts 49, shown in Fig. 2. Since the lateral thrust is all taken by the bearing 33, the bearing 32 is left free for lateral adjustment.

In order to provide for inspection of the bearings without removing them from the quill, the cartridges 34 and 35 are so constructed that they may be moved axially sufficiently to expose the bearings when the lower portion 30 of the housing 28 is removed. Thus, when the lower portion 30 is removed, the quill may be dropped down sufficiently to permit the cartridge 34 to clear the shoulder 36 on the upper portion 29 of the housing 28, and the cartridge may be moved inwardly along the quill 11 to expose the bearing 32. Likewise, the cartridge 35 may be moved inwardly when the flange 42 is dropped out of the groove 43 and the bolts 45 are removed to detach the bearing cap 44. In this manner, either one of the bearings may be inspected without dismantling the complete drive structure.

When assembling the drive, the bearing 32, the retainers 38 and 39 and the spacing ring 41 may be placed in the cartridge 34 and this assembly then mounted on the section 26 of the quill 11. Likewise, the bearing 33, the cap 44 and the ring 46 may be placed on the quill section 27 and retained by the collar 47. The cartridge 35 may then be placed on the section 27 of the quill and the two sections of the quill pressed together. The bearing cap 44 may then be secured in position by the bolts 45 and the complete quill and cartridge assembly may be placed on the axle 13 and the wheels 12 pressed on the axle.

The complete assembly may then be placed in the housing 28 and retained in position by bolting the lower portion 30 of the housing to the upper portion 29. As explained hereinbefore, inspection of the bearings may be made by merely removing the lower portion 30 of the housing and dropping the axle and quill downwardly a sufficient distance to permit the bearing cartridges to be moved axially along the quill.

From the foregoing description, it is apparent that I have provided a simplified and improved roller bearing quill drive in which the bearings are enclosed in cartridges which permit inspection of the bearings without dismantling the drive. Provision is also made for taking care of the lateral thrust of the drive in a simple and effective manner, thereby prolonging the life of the equipment.

Since numerous changes may be made in the above described construction and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. In a locomotive drive, in combination, an axle, a wheel removably secured to each end of the axle, a rotatable quill surrounding the axle, a spider secured to one end of the quill, a gear and spider secured to the other end of the quill, a motor having a pinion for driving the gear, a divided housing secured to the motor frame for the quill, roller bearings for the quill, a cartridge disposed in the housing for each roller bearing, said cartridges being movable axially toward each other for inspection of the bearings when a portion of said housing is removed and the axle and quill are dropped, and resilient members disposed in said spiders to engage said wheels.

2. In a locomotive drive, in combination, an axle, a wheel removably secured to each end of the axle, a rotatable quill surrounding the axle, a spider secured to one end of the quill, a gear and spider secured to the other end of the quill, a motor having a pinion for driving the gear, a divided housing secured to the motor frame for the quill, roller bearings for the quill, a cartridge disposed in the housing for each roller bearing, said cartridges being movable axially toward each other for inspection of the bearings when a portion of said housing is removed and the axle and quill are dropped, means in the housing cooperating with means on the cartridges to retain them in the housing when it is assembled, and resilient members disposed in said spiders to engage the wheels.

3. In a locomotive drive, the combination with an axle and a wheel removably secured to each end of the axle, of a rotatable quill surrounding the axle, said quill comprising two cylindrical sections one of which overlaps the other, a spider secured to one end of one section of the quill, a gear and spider secured to one end of the other section of the quill, a motor having a pinion for driving the gear, a housing in the motor frame for the quill, roller bearings for the quill, a cartridge for each roller bearing, one of said cartridges being removably disposed in said housing on one section of the quill and the other cartridge being removably disposed in said housing on the other section of the quill, and resilient members disposed in said spiders to engage said wheels.

4. In a locomotive drive, the combination with an axle and a wheel removably secured to each end of the axle, of a rotatable quill surrounding the axle, said quill comprising two cylindrical sections one of which overlaps the other, a flange at the outside end of each section of the quill, a spider removably secured to the flange at one end of the quill, a gear and spider removably secured to the flange at the other end of the quill, a motor having a pinion for driving the gear, a housing in the motor frame for the quill, roller bearings for the quill, a cartridge for each roller bearing, one of said cartridges being removably disposed in said housing on one section of the quill and the other cartridge being removably disposed in said housing on the other section of the quill, and resilient members disposed in said spiders to engage said wheels.

5. In a locomotive drive, in combination, an axle, a wheel removably secured to each end of the axle, a rotatable quill surrounding the axle, a spider secured to one end of the quill, a gear and spider secured to the other end of the quill, a motor having a pinion for driving the gear, a divided housing secured to the motor frame for the quill, roller bearings for the quill, a cartridge disposed in the housing for each roller bearing, said cartridges being movable axially toward each other for inspection of the bearings when a portion of said housing is removed, a divided collar surrounding the quill to retain one of said bearings in position, a portion of said collar being of a wedge shape and disposed in a groove in the quill, and resilient members disposed in said spiders to engage said wheels.

FRANK L. ALBEN.

REFERENCES CITED

The following references are of record in the file of this patent:

UNITED STATES PATENTS

| Number | Name | Date |
|---|---|---|
| 894,915 | Storer | Aug. 4, 1908 |
| 1,126,143 | Webster | Jan. 26, 1915 |
| 1,906,243 | Baninger | May 2, 1933 |
| 2,214,424 | McGrew | Sept. 10, 1940 |
| 2,234,070 | Barton | Mar. 4, 1941 |